United States Patent [19]
Nagai

[11] Patent Number: 5,659,719
[45] Date of Patent: Aug. 19, 1997

[54] DATA MULTIPLEX CIRCUIT

[75] Inventor: Hiroshi Nagai, Tokyo, Japan

[73] Assignee: Ando Electric Co., Ltd., Tokyo, Japan

[21] Appl. No.: 645,694

[22] Filed: May 14, 1996

Related U.S. Application Data

[63] Continuation of Ser. No. 142,080, Oct. 28, 1993, abandoned.

[30] Foreign Application Priority Data

Oct. 30, 1992 [JP] Japan .................................. 4-316142

[51] Int. Cl.⁶ .................................................. G06F 1/12
[52] U.S. Cl. .................................... 395/551; 327/153
[58] Field of Search .......................... 395/551; 375/354, 375/362, 371; 327/141, 142, 144, 153, 161

[56] References Cited

U.S. PATENT DOCUMENTS

| | | | |
|---|---|---|---|
| 4,694,472 | 9/1987 | Torok et al. | 327/141 X |
| 4,894,821 | 1/1990 | Hayano | 370/371 |
| 4,965,797 | 10/1990 | Yamane et al. | 375/371 X |
| 5,175,544 | 12/1992 | McKeen | 375/354 X |
| 5,239,546 | 8/1993 | Hayashi | 370/112 |

*Primary Examiner*—Thomas M. Heckler
*Attorney, Agent, or Firm*—Finnegan, Henderson, Farabow, Garrett & Dunner, L.L.P.

[57] ABSTRACT

A data multiplex circuit possessing a short delay for generating a signal which is synchronous with the phase of the data from the data generation circuit, and for generating a multiplex clock corresponding to this signal. A data generation circuit generates a reference signal which is adjusted to match the output of the data. This reference signal is compared to a multiplex clock by a comparison circuit. The output of the comparison circuit is then converted by a control circuit into a reset signal which, based on the phase difference, resets a dividing circuit for multiplexing. The dividing circuit resets continuously until the phase of its output signal matches that of the data output of the data generation circuit. By resetting the dividing circuit, the phase of the multiplex clock signal to be input into multiplex circuit is correlatively synchronized with regard to the delay of the data generation circuit. Consequently, the multiplex clock and the retiming clock do not need to be synchronous with the phase of the data generation circuit, and multiplexing can be performed on arbitrary frequencies.

1 Claim, 5 Drawing Sheets

DATA MULTIPLEX CIRCUIT

This application is a continuation of application Ser. No. 08/142,080, filed Oct. 28, 1993, now abandoned.

BACKGROUND OF THE INVENTION

1. Field of the Invention

The present invention relates to a multiplex circuit which generates high-speed data by multiplexing this data. In particular, the present invention relates to a multiplex circuit corresponding to an arbitrary frequency.

2. Description of Related Art

A block diagram of a conventional data multiplex circuit is shown in FIG. 4. In FIG. 4 a data generation circuit 11, multiplex circuit 4, dividing circuit 6, retiming circuit 8 and delay components 7, 15 for use in phase adjustment are provided.

Dividing circuit 6 receives a clock signal from input clock terminal 20, and generates dividing clock signal 6A. Dividing clock signal 6A is then input into data generation circuit 11. Data generation circuit 11 then generates data signal 11A which is synchronized with dividing clock signal 6A.

Delay component 15 receives the dividing clock signal 6A of dividing circuit 6, outputs and delay signal 15A. Multiplex circuit 4 receives data signal 11A and delay signal 15A, and performs multiplexing of this delay signal 15A as a synchronized clock. In other words, delay signal 15A functions as a multiplex clock signal adjusted to the phase of data signal 11A, and generates multiplex data signal 14A by means of multiplex circuit 4.

Delay component 7 delays the clock signal to be input from input clock terminal 20, and outputs delay signal 7A. Retiming circuit 8 receives as input multiplex data signal 14A and delay signal 7A. Delay signal 7A functions as a retiming clock adjusted to the phase of multiplex data signal 14A, which retimes the multiplex data signal 14A and outputs a multiplex signal from output terminal 21.

FIG. 5 shows a time chart of a conventional data multiplex circuit shown in FIG. 4. In FIG. 5, a waveform graph 20A of input clock 20 and an output waveform graph 6A of dividing circuit 6 are provided. In this figure, input clock 20 is divided by four, and then output. Output 6A of dividing circuit 6 is delayed by a delay time T1 from the input clock and then generated.

Data signal 11A to be output from data generation circuit 11, is generated after being delayed by a delay time T2 from the time when output 6A of dividing circuit 6 is input into data generation circuit 11. Output waveform 15A of delay component 15 is generated after being delayed by a delay time T7 from the waveform of output 6A. This output 15A functions as the waveform of the multiplex clock signal with a phase matching that of data 11A, and is adjusted according to an input margin of data signal 11A.

Output waveform 14A of multiplex circuit 14 is initially delayed by the operation time of multiplex circuit 14, and then generated after being delayed by a delay time T5. Output waveform 7A of delay component 7 is generated after being delayed by a delay time T8 from the waveform of clock signal 20A. This output 7A functions as the waveform of the retiming clock with a phase matching that of multiplex data signal 14A.

However, in the aforementioned structure of this conventional technology, it is necessary to delay multiplex clock 15A, bound for multiplex circuit 4, by a time T7 representing the delay T2 of data generation circuit 11 and the input margin to multiplex circuit 4 using delay component 15. In addition, it is also necessary to delay retiming clock 7A, bound for retiming circuit 8, by a time T8 corresponding to the sum of the delay T1 of dividing circuit 6, delay T7 of the dividing clock to multiplex circuit 4 and delay T5 of multiplex circuit 4, using delay component 7.

In this manner, the absolute delay time of the data generation circuit increases with increasing multiplicity, which consequently results in an increase in the absolute delay amount of multiplex clock 15A and retiming clock 7A.

SUMMARY OF THE INVENTION

In order to solve the aforementioned problems in the conventional technology, it is an objective of the present invention to provide a data multiplex circuit which possesses a small delay for generating a signal from a data generation circuit with a phase matching that of the data, and for generating a multiplex clock corresponding to the aforementioned signal.

In order to achieve the above objective, the present invention provides a data multiplex circuit for generating high-speed data by means of multiplexing data, said data multiplex circuit comprising:

a first dividing means for dividing an input clock to output as a data generation clock;

a second dividing means for dividing said input clock to output as multiplex clock;

a data generation means for generating data which is synchronized with said data generation clock outputted from said first dividing means, and for outputing a reference signal which is synchronized with said synchronized data;

a comparison means for detecting a phase difference between said reference signal from said data generation means, and said multiplex clock from said second dividing means;

a multiplex means for multiplexing said synchronized data outputted from said data generation means, accordance with said dividing clock; and a control means for resetting said second dividing means when said phase difference is unacceptable to multiplex said data in said multiplex means.

DETAILED DESCRIPTION OF THE INVENTION

Figure 1:
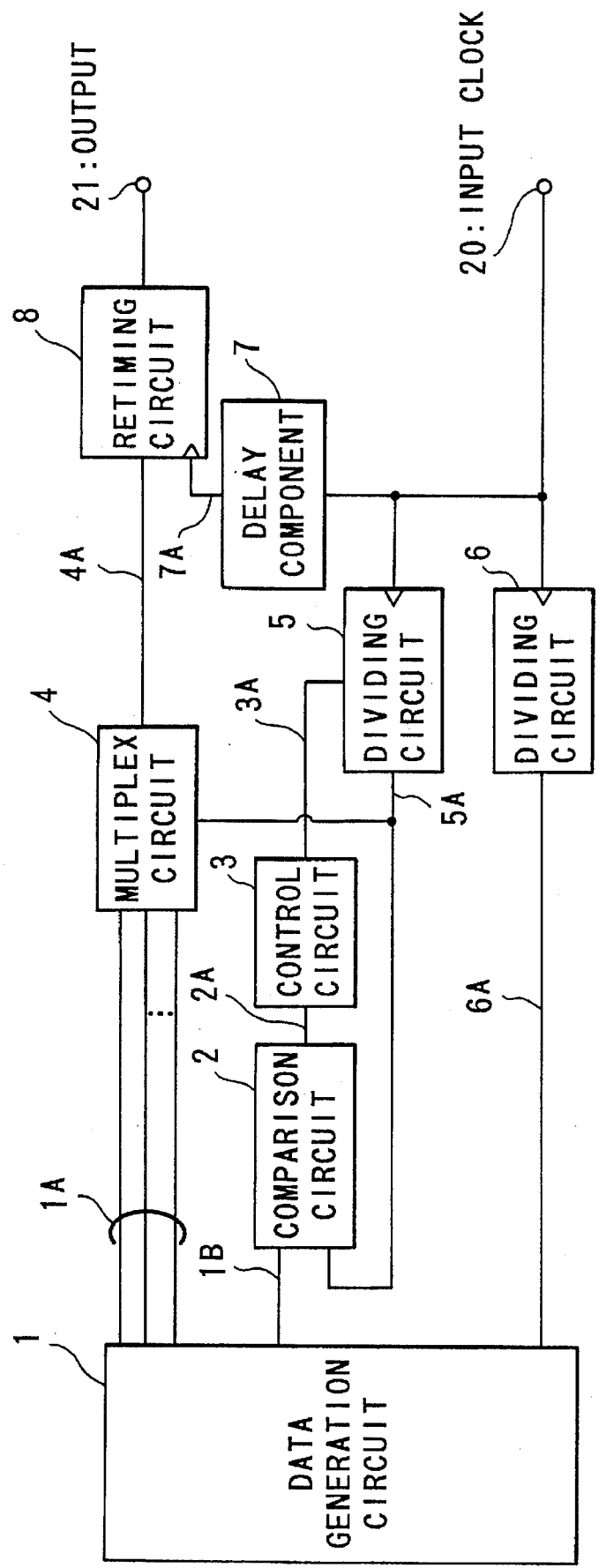
FIG. 1 is a functional block diagram showing a data multiplex circuit according to an embodiment of the present invention.

In the present invention, as shown is FIG. 1, an input clock 20 is divided by dividing circuit 6 and transmitted to data generation circuit 1 as a synchronous clock. Data generation circuit 1 outputs data by means of the synchronous clock from dividing circuit 6, and sends a reference signal 1B which adjusts the phase of this data to match that of comparison circuit 2. When comparison circuit 2 receives this reference signal, it compares this signal to a multiplex clock output from dividing circuit 5, and sends this comparison result to control circuit 3. In the case when the comparison result inputted represents a phase difference which cannot be multiplexed, control circuit 3 resets dividing circuit 5.

Figure 4:
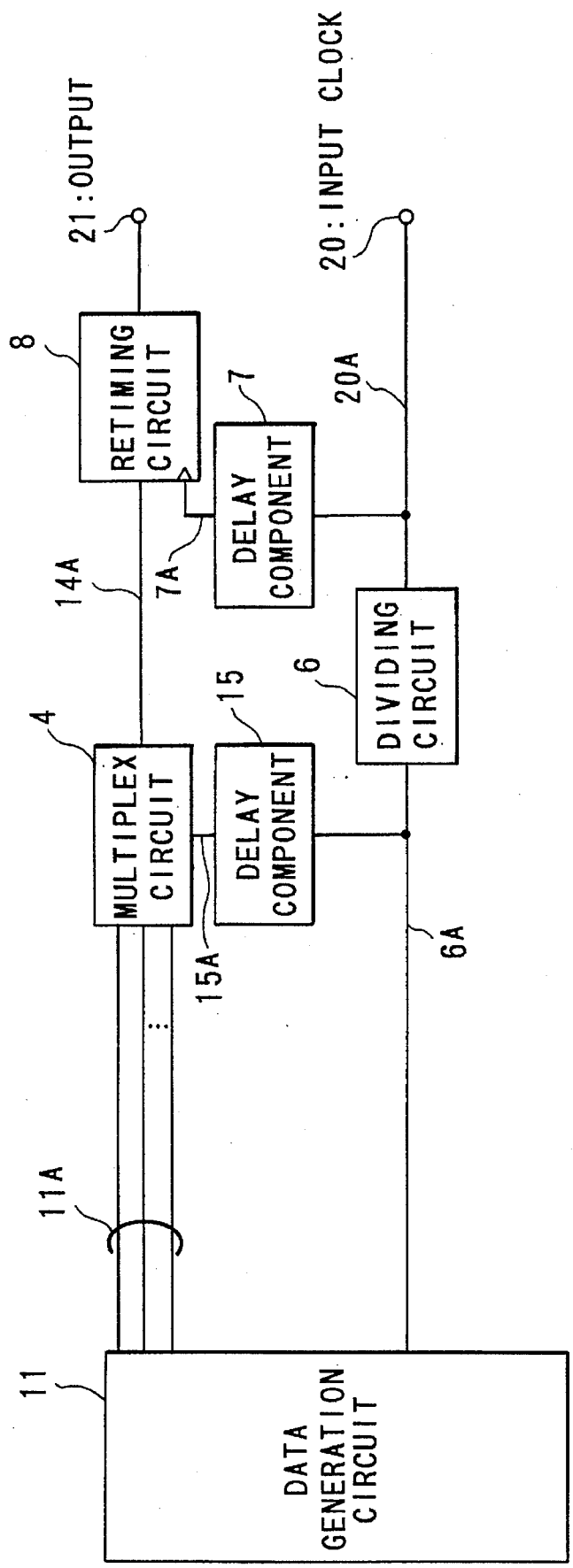
FIG. 4 is a block diagram showing a conventional data multiplex circuit.
Figure 5:
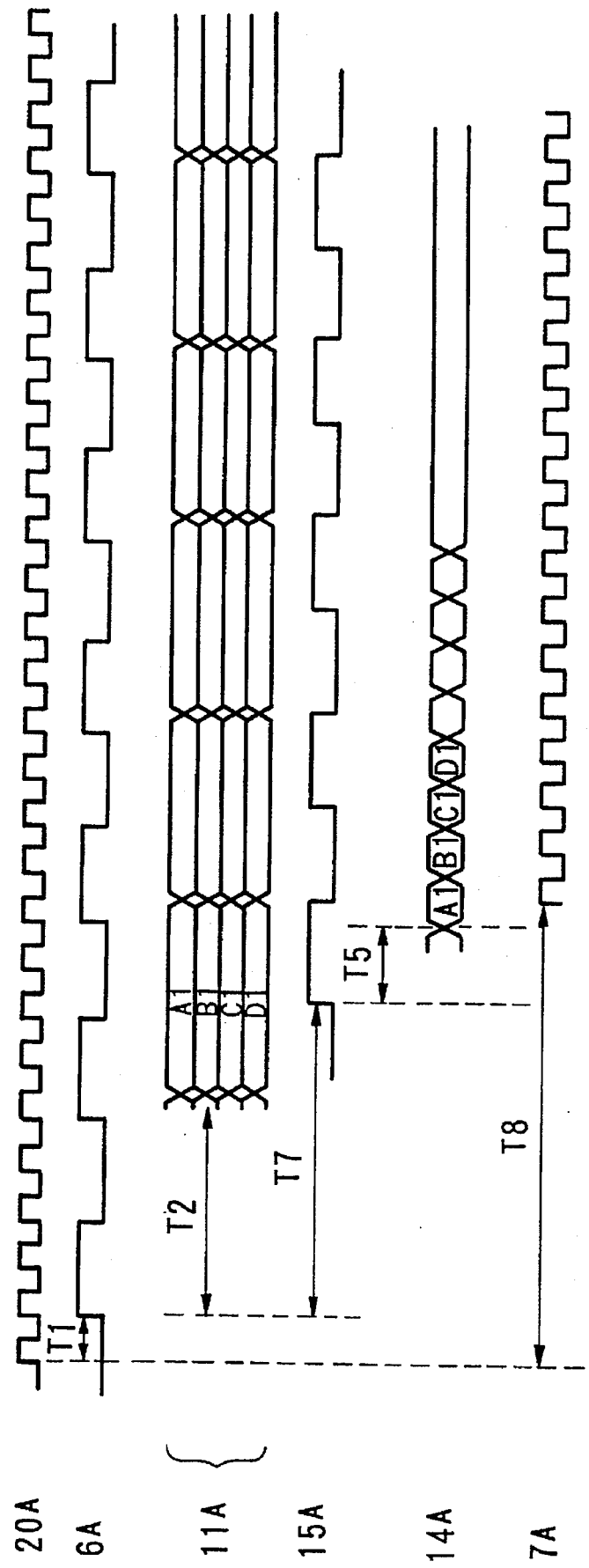
FIG. 5 is a waveform diagram of the data multiplex circuit shown in FIG. 4.

FIG. 1 shows a data multiplex circuit according to a preferred embodiment of the present invention. In FIG. 1, a data generation circuit 1, comparison circuit 2, control circuit 3 and dividing circuit 5 for use in a multiplex circuit are provided. In addition, in FIG. 1, multiplex circuit 4, dividing circuit 6 for use in a data generation circuit, delay component 7 and retiming circuit 8 represent circuits and components with the same functions as those shown in FIG. 4. In the present embodiment, utilizing a structure comprising a comparison circuit 2, control circuit 3 and dividing circuit 5, a multiplex clock supply circuit to multiplex circuit 4 is constructed in place of delay component 15 shown in FIG. 4.

Data generation circuit 1 generates a reference signal 1B corresponding to the data output. This reference signal 1B is compared to multiplex clock signal 5A by means of comparison circuit 2, and this output is converted into reset signal 3A by means of control circuit 3 which resets dividing circuit 5 for multiplexing using the phase difference therein.

Dividing circuit 5 for multiplexing repeats the reset process until the phase matches that of the data output of the data generation circuit. In other words, by resetting dividing circuit 5, the phase of the multiplex clock of dividing circuit 5 to be inputted into multiplex circuit 4 is correlatively adjusted with regard to the delay of data generation circuit 1. Consequently, it is not absolutely necessary for multiplex clock signal 5A and retiming clock signal 7A to be synchronous with the phase of the data generation circuit, and thus multiplexing can be performed on arbitrary frequencies as well.

Figure 2:
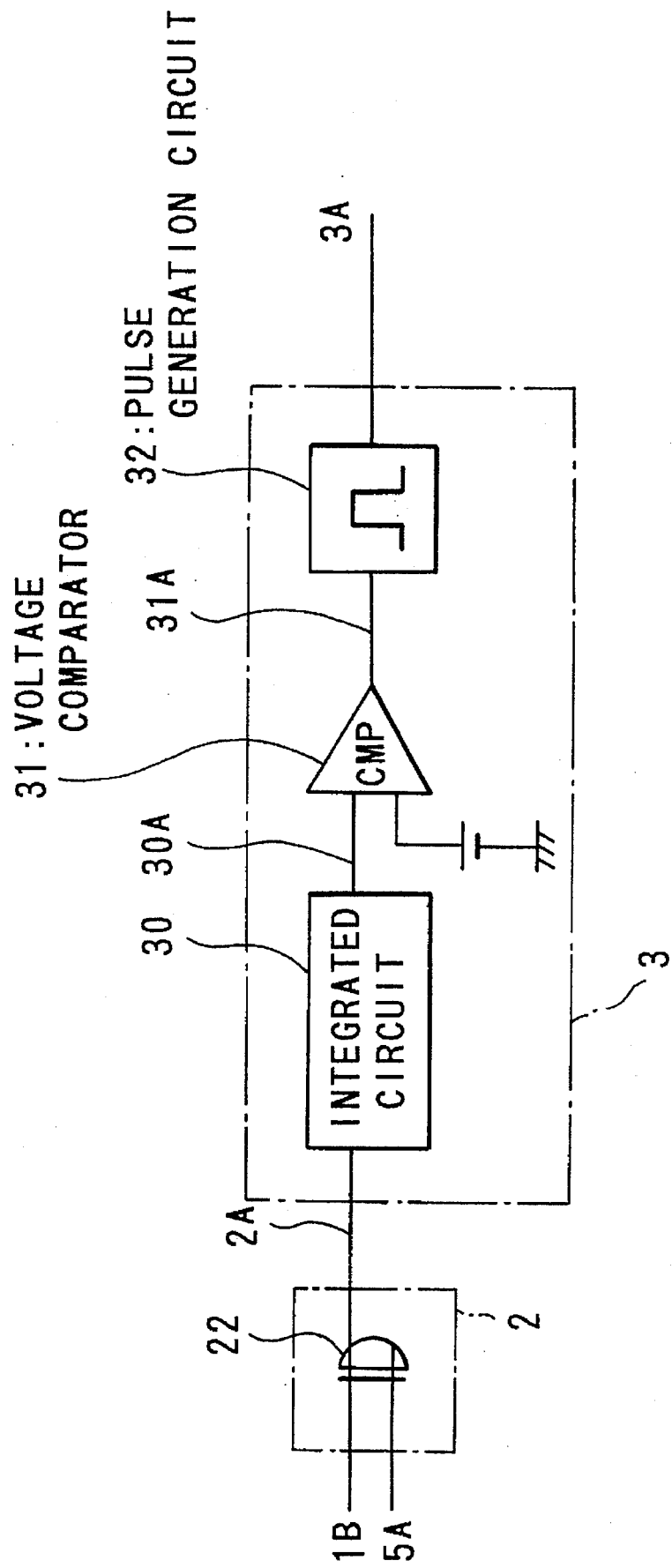
FIG. 2 is a block diagram showing a comparison circuit 2 and control circuit 3 of the data multiplex circuit shown in FIG. 1.

In the following, comparison circuit 2 of the multiplex circuit in FIG. 1, and an example circuit of control circuit 3 will be explained with reference to FIG. 2. FIG. 2 shows a circuit which, in the case when a phase difference exists between reference signal 1B and multiplex clock signal 5A, detects a phase difference greater than a fixed value and generates a reset signal 3A for input to dividing circuit 5 for multiplexing.

Comparison circuit 2 receives reference signal 1B from the data generation circuit and multiplex clock signal 5A into exclusive OR 22, uptakes the exclusive OR of these signals, and outputs phase difference signal 2A to control circuit 3.

In control circuit 3, signal 2A from comparison circuit 2 is integrated using integrated circuit 30, and then output to one input voltage comparator 31 as average voltage signal 30A. A second input terminal of voltage comparator 31 is connected to a constant voltage source, and thus voltage comparator 31 determines the phase difference by comparing the voltage source value with the average voltage signal 30A. Voltage comparator 31 generates a signal 31A in the case when the average voltage signal 30A represents a phase difference that cannot be multiplexed.

Signal 31A is input into repeating pulse generation circuit 32 which effectively resets dividing circuit 5 for use in a multiplex circuit. The aforementioned signal 31A is converted by means of this pulse generation circuit 32 into reset signal 3A which is then output.

Figure 3:
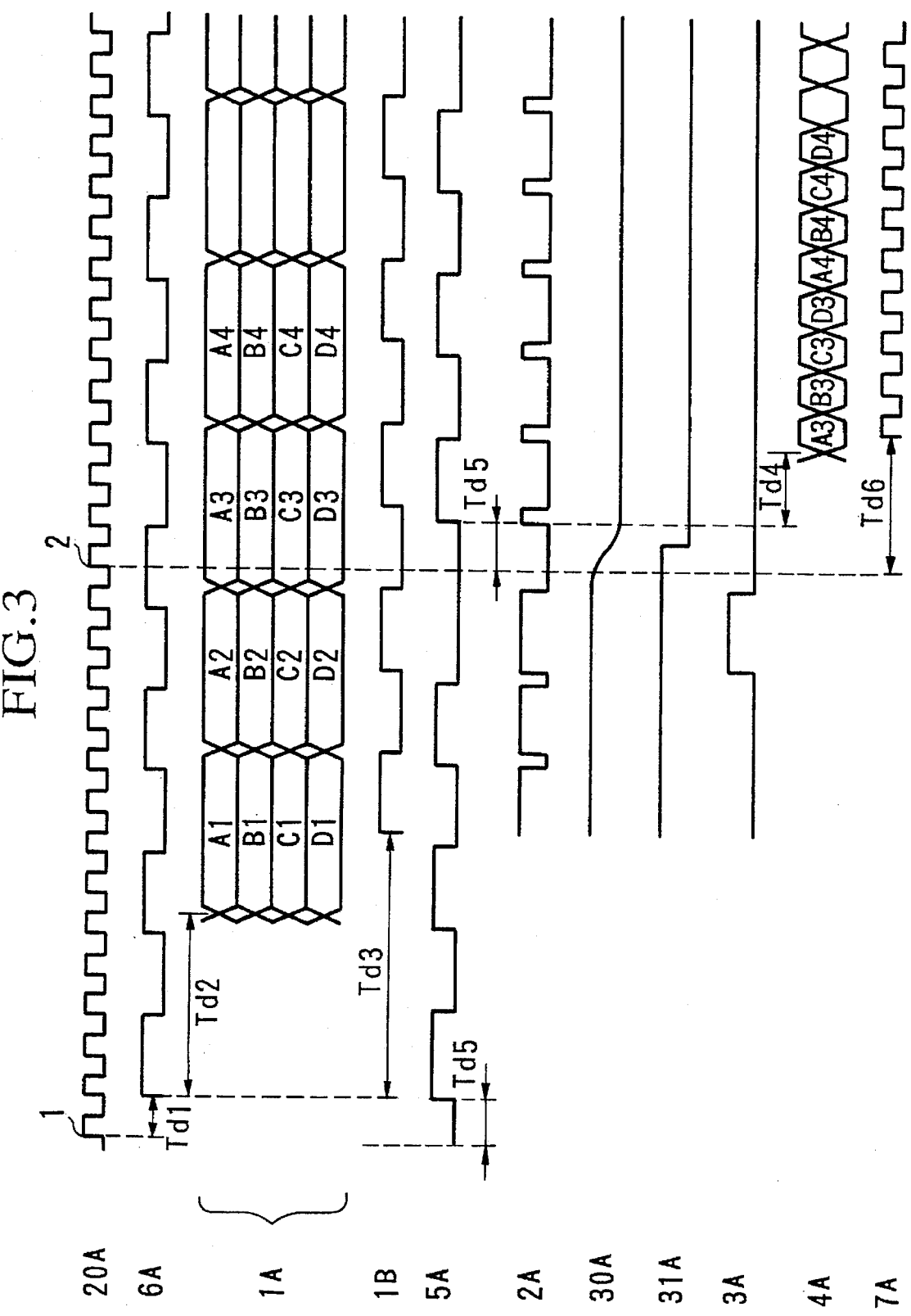
FIG. 3 shows a waveform diagram of the data multiplex circuit shown in FIG. 1.

In the following, the time chart of FIG. 1 will be explained with reference to FIG. 3. In FIG. 3, a waveform graph of an input clock signal 20A, and a waveform graph of a dividing clock signal 6A, output from dividing circuit 6 for use in a data generation circuit, are provided. Clock 6A is generated after a delay Td1 which corresponds to the delay of dividing circuit 6.

In addition, waveform graphs of the output data 1A and reference signal 1B of data generation circuit 1 are also provided in FIG. 3. Data 1A is generated after a delay Td2 which corresponds to the delay of the data generation circuit. Reference signal 1B is synchronous with the phase of data 1A and is generated after a delay Td3 which takes into consideration the input margin of multiplex circuit 4.

In the figure, a waveform graph of multiplex clock 5A, which functions as the output of dividing circuit 5 for use in a multiplex circuit, output signal 2A of comparison circuit 2, and average voltage signal 30A of output signal 2A are also provided. The aforementioned clock 5A is generated after a delay TD5 which corresponds to the delay of dividing circuit 5.

When the phase difference between reference signal 1B and clock 5A is determined to be inappropriate by integrated circuit 30, signal 31A is generated by voltage comparator 31. In addition, a waveform graph of signal 3A which resets dividing circuit 5 for use in a multiplex circuit is also shown in the figure.

Multiplex clock 5A of dividing circuit 5 for use in a multiplex circuit which was reset by signal 3A is newly generated after a delay Td5 from the edge i of input clock 20A. In this manner, multiplex clock 5A is generated to match the phase of data 1A from data generation circuit 1, and consequently multiplexing becomes possible.

In addition, waveform graphs of an output 4A of multiplex circuit 4 and retiming clock 7A are also provided in the figure. Output 4A is generated after a delay Td4 corresponding to the delay of the multiplex circuit. With regard to the aforementioned, it is possible for retiming clock 7A be synchronous with the only output 4A of multiplex circuit 4, while delay Td6 corresponds to the sum of delay Td5 of dividing circuit 5 for use in a multiplex circuit and delay Td4 of multiplex circuit 4.

According to the present invention, multiplex clock 5A is controlled and generated so as to have a synchronous phase with delay time Td2 of data generation circuit 1, and thus it is not necessary to delay the process by delay time Td2. Because this delay of multiplex clock 5A no longer exists, it is possible for retiming clock 7A, which determines the phase with regard to multiplex clock 5A, to be delayed by only the sum of delay times Td4 and Td5 of multiplex circuit 4 and dividing circuit 5 respectively. Consequently, it is possible to multiplex arbitrary frequencies corresponding to arbitrary delays of the data generation circuit.

What is claimed is:

1. A data multiplex circuit for generating high-speed data by multiplexing data, said data multiplex circuit comprising:

first dividing means for dividing an input clock and generating a data generation clock;

second dividing means for dividing said input clock and generating a multiplex clock, said second dividing means being resettable;

data generation means for generating data synchronous with said data generation clock, and for outputting a reference signal which is synchronized with said generated synchronous data, said generated synchronous data having a same delay as said data generation clock;

comparison means for comparing a phase of said reference signal from said data generation means to a phase of said multiplex clock from said second dividing means;

multiplex means for multiplexing said generated synchronous data synchronous with said multiplex clock; and control means, responsive to said comparison means, for resetting said second dividing means when said reference signal from said data generation means is out of phase with said multiplex clock from said second dividing means, whereby said generated synchronous data is synchronous with said multiplex clock.

* * * * *